March 15, 1966     R. A. SCHOPPMAN     3,240,912
TUBE UNION REMOVAL TOOL
Filed Sept. 5, 1963
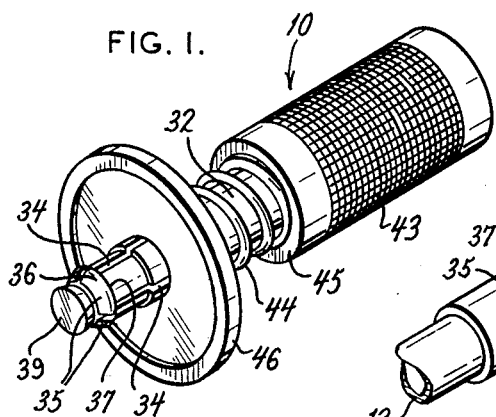
FIG. 1.
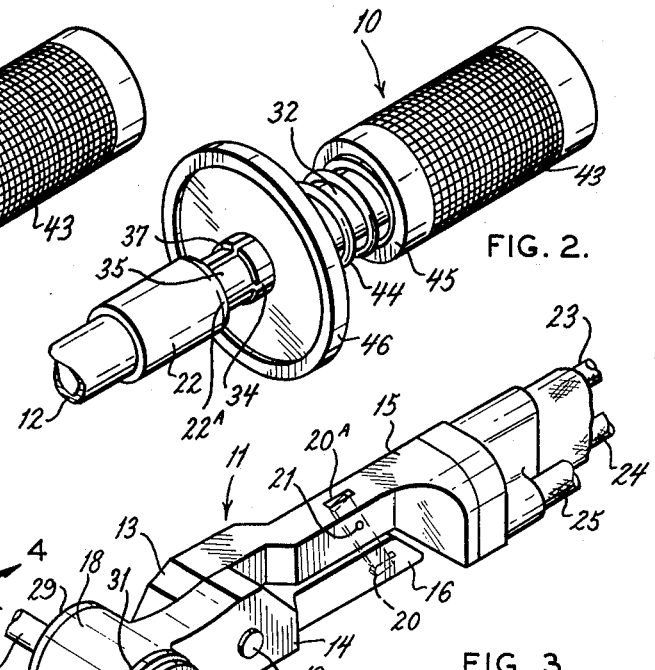
FIG. 2.
FIG. 3.
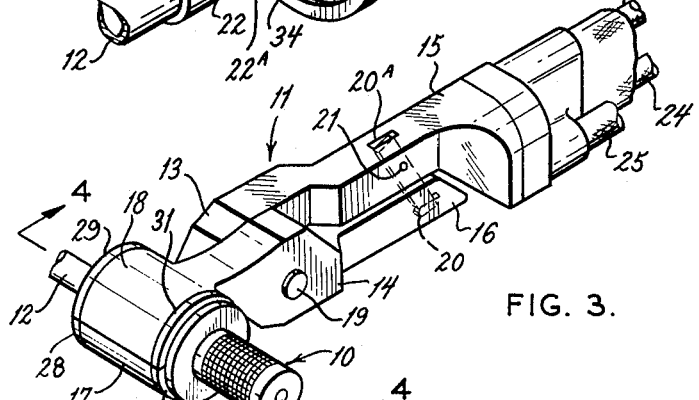
FIG. 4.
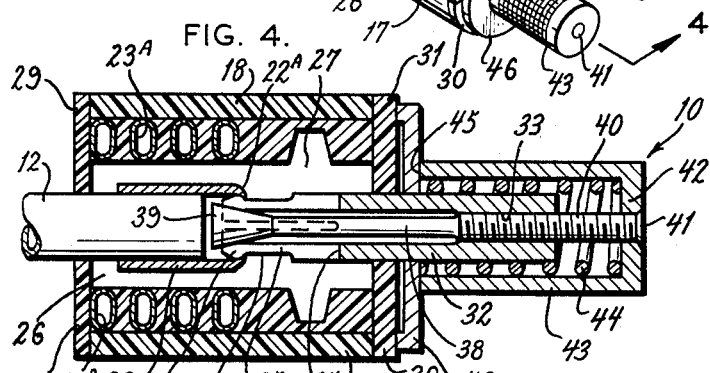
FIG. 5.
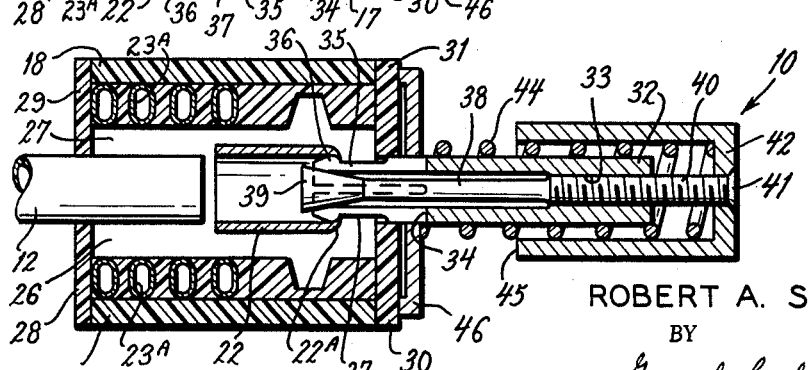
INVENTOR.
ROBERT A. SCHOPPMAN
BY
Gravely, Lieder & Woodruff
ATTORNEYS

United States Patent Office 3,240,912
Patented Mar. 15, 1966

1

3,240,912
TUBE UNION REMOVAL TOOL
Robert A. Schoppman, Florissant, Mo., assignor, by mesne assignments, to Aeroquip Corporation, Jackson, Mich.
Filed Sept. 5, 1963, Ser. No. 306,870
7 Claims. (Cl. 219—7.5)

The invention described herein was made in the performance of work under a NASA contract and is subject to the provisions of the National Aeronautics and Space Act of 1958, Public Law 85–568 (72 Stat. 426; 42 U.S.C. 2451), as amended.

The present invention relates to tools useful for removing brazed coupling unions in tubing systems, and is particularly directed to portable hand tools for quickly and cleanly removing a brazed coupling union or stub of such a union between tube ends in a system of tubing.

The presently known tools for removing a brazed on coupling union in tubing systems produce objectionable results, such as undesirable tube surface oxidization, contamination of surfaces, and wear in the tools used due to the heat factor and loading while pulling the union. It is also objectionable to employ the heating unit of present tools as the means to exert the necessary force on the union to effect its removal.

The present invention is directed to a tool in which the brazed union is exposed to heat for softening the brazing material to an extent sufficient for pulling means to effect the union removal and avoid loading the heating means. A preferred form of this invention utilizes the principle of the brazing tool disclosed in a prior application of Schoppman and Konecny, Serial No. 231,984, filed October 22, 1962, and assigned to the assignee of this application, in conjunction with a pulling device so that the new tool is self-supporting and compact and protects the tube after the union has been removed.

It is, therefore, a principal object of this invention to provide a relatively inexpensive, easy to operate, portable and compact tool for removing brazed on tube unions.

Another object of this invention is to provide an improved tube union removing tool which combines the heat producing means with a simple pulling device which permits the tube to be protected against oxidation and contamination while in use.

A further object of this invention is to provide a tube union removing tool which is self-supporting and automatically pulls the union from the tube at the proper time.

Yet another object of this invention is to provide a tool that can be used in places where room is at a minimum, or used upon tubing systems where it is highly desirable to maintain clean conditions.

Another object of this invention is to provide an improved tool that can be applied, operated and removed by relatively unskilled workers.

These and other objects and advantages of this invention will become apparent from the following description

2 of a preferred embodiment shown in the accompanying drawings, wherein:

FIG. 1 is a perspective view, on an enlarged scale, of the union pulling component of the composite tool;

FIG. 2 is a perspective view, on an enlarged scale, of the union pulling component of the present tool shown as applied to a tube from which the union is to be removed;

FIG. 3 is a perspective view of the composite tool showing the heating component and union pulling component as applied to a tube;

FIG. 4 is a longitudinal sectional view, on an enlarged scale, taken at line 4—4 in FIG. 3; and FIG. 5 is a view similar to FIG. 4, but showing the union pulled free of the tube.

Referring to FIG. 3 the composite tool is seen to include a pulling component 10 and a heating component 11 as applied to a tube 12. As described in the prior application Serial No. 231,984, the component 11 has two hingedly connected members 13 and 14 each of which has a handle portion 15 and 16, respectively, by which the tube engaging portions 17 and 18 are moved apart and clamped upon the tube 12. The means 19 forms the hinge axis for the members 13 and 14. The members are held together upon tube 12 by catch means 20 mounted in slot 20A and pivoted upon pin 21 in handle 15, as shown in said prior application, so that heat may be applied to the coupling union 22 which is brazed upon the tube 12 to act as a connector between tube 12 and another tube (not necessary to show).

The heating component 11 is provided with pipe connections 23 and 24 adapted to supply high frequency electric energy from a suitable source, as well as cooling fluid which is circulated therethrough from a suitable source. The pipe connection 25 supplies an inert gas, such as argon. The pipes 23, 24 and 25 extend through the handle 15 to suitable internal distribution passages associated with means 19 and the tube engaging portions 17 and 18. The portions 17 and 18 provide semi-cylindrical chambers 26 and 27 respectively enclosing the union 22 as seen in FIG. 4. Cooperating walls 28 and 29 on one end of the portions 17 and 18 have semi-circular cut-outs which close about the tube 12 to enclose the union 22 from one end. The opposite end of the portions 17 and 18 have other end walls 30 and 31 formed with cooperating semi-circular cut-outs which cooperate with the pulling component 10 presently to be described. The walls 30 and 31 may be of heavier gauge material so as to withstand a surface load without yielding to distortion.

In the manner described in said prior application Serial No. 231,984, the conduit 25 supplies inert gas to the chamber 26 where it fills the two chambers 26 and 27 and expel the air therein as desired. Similarly the connection 23 extends into the portion 17 and forms the series of flattened tubular heating elements 23A before extending back into the region of the means 19 and then into the portion 18 to connect with another series of flattened tubular heating elements 23A in portion 18. The electric and fluid circuits are completed through a suitable connection in means 19 with the other connection 24.

Thus, elements 23A form the means for heating the union-tubing workpiece within chambers 26 and 27, as well as for supplying a cooling fluid to cool the elements 23A.

Referring now to FIGS. 1, 2 and 5, the pulling component 10 of the present tool includes a tubular sleeve 32 having an internally threaded bore 33 at one end and a plurality of circumferentially spaced longitudinal slots 34 in the opposite end portion to provide a plurality of flexible fingers 35 thereon. Each finger has an enlarged end 36 outwardly of a reduced diameter portion forming an annular relief 37 adjacent the enlarged ends 36. The sleeve 32 houses a pin 38, one end of which is provided with a cone-shaped head 39 which cooperates with the flexible sleeve fingers 35 to force the fingers apart or outwardly to expand the effective circumferential size of the enlarged ends 36. The opposite end 40 of the pin 38 is threaded in the bore 33 of the sleeve and passes through the sleeve for fixed mounting at 41 in the end wall 42 of a barrel nut 43. The nut has an external knurled surface for easy gripping, and the body of the nut encloses the sleeve 32 in spaced relation to provide an annular socket to receive a coiled spring or other elastic or resilient means 44. The open end 45 of the barrel nut is adapted to engage a pressure disc 46 which is mounted to slide on the sleeve 32.

It can be appreciated that by holding the sleeve 32 against rotation and suitably rotating the barrel nut 43 relative thereto, the pin 38 is rotated and the cone head 39 is caused to move inwardly with respect to the fingers 35 and thereby expand the size of the enlarged ends 36. Reverse rotation of the barrel nut 43 will move cone head 39 out of the sleeve 32 and allow the enlarged ends 36 to contract to normal positions. The pressure plate 46, of course, slides on sleeve 32 and is normally pushed away from the end 45 of barrel nut 43 by the means 44 (FIG. 1). The pulling component 10, thus can be attached to the tube 12 at the end of the union 22 which has been previously cut by a suitable cutting tool (not shown). In the cutting operation the cut end is burred inwardly to form a lip 22A. Component 10 is adapted to grip the union 22 from the interior of the lip 22A (FIGS. 4 and 5) by the cone head 39 expanding the flexible fingers 35 so that the ends 36 thereon are inside the burr lip. This is achieved by first extending the pin 38 upon (clockwise) rotation of the barrel nut 43 while holding sleeve 32 so that the fingers 35 may flex inwardly and allow the collective enlarged ends 36 to move together until they can pass into the union 22. Reverse rotation of the barrel nut 43 will draw the cone head 39 into the sleeve, thus expanding the ends 36 inside the union 22 until a firm grip is achieved and the pulling component 10 is rendered self-supporting on the union 22 (FIG. 2).

Once the component 10 has been mounted on the union 22, the heating component 11 is disposed over the union 22 such that the chambers 26 and 27 enclose the latter. The component 11 is then slid toward the barrel nut 43 to push the plate 46 against the end 45 of the nut and compress the means 44, thereby creating a thrust pressure on the end walls 30 and 31. The component 11 is then clamped in position on the tube 12 with the cut portion of union 22 disposed between the elements 23A. The connections 23, 24 and 25 may now be joined with the sources of electric energy, cooling fluid and inert gas. As the elements 23A are constructed of conducting material they produce heat of desired temperature in the union 22 by induction when energized by high frequency alternating current. A temperature of up to about 1900° F. may be required to melt the brazing material in the union 22. During the heating cycle inert gas is fed through connection 25 to the chambers 26 and 27 to displace the air and prevent oxidation. Upon reaching the melting stage of the brazing material, the compressed means 44 acting on pressure plate 46 will automatically slide the union 22 off the tube 12 (compare FIGS. 4 and 5). This condition is immediately apparent as the barrel nut 43 moves away from the plate 46 to visually indicate that the union 22 has been pulled off the tube 12. The tool may then be left on the tube 12 until cooling of the chambers 26 and 27 has reduced the temperature to a level where oxidation does not occur and will not contaminate the tube 12.

Changes and modifications in the present tool may be made or will come to mind after considering the foregoing disclosure and drawings. Therefore, all such changes and modifications making use of the structural principles and method of use hereof are deemed included within the scope of the appended claims.

Whas is claimed is:

1. A tube union removing tool including a tube union heating component formed with walls enclosing and forming a heating chamber for the union to be removed, and a union pulling component comprising union gripping means disposed in said heating chamber and slidable through one wall thereof, means externally engaged on said one wall and connected to said gripping means, and means exerting a force between said one wall and said external means for sliding said gripping means relative to said one wall and pulling the union from the tube upon heating of the union.

2. A composite tool to heat brazed-on tube unions and pull the union off a tube, said tool including: a pulling component having union gripping means, a relatively movable pressure exerting member carried by said gripping means and force exerting means between said member and gripping means; and a heating component having a heating chamber adapted to enclose the union to be heated and pulled and a wall for said chamber engaged by said pressure exerting member, said gripping means moving relative to said heating chamber to remove the union from the tube under the influence of said force exerting means upon heating of the union.

3. A composite tool to heat brazed-on tube unions and pull the union from the tube including: a union pulling component having a sleeve formed with a head insertable and expandable into a union to be pulled and grip the union, and force exerting means carried on and engaging an abutment surface on said sleeve; and a heating component having heating chamber portions encircling the periphery of the union and end walls enclosing the union from its opposite ends, one of said end walls slidably receiving said sleeve to permit the expandable head to be located in said heating chamber portions, said sleeve and heating component being relatively movable under the effect of said force exerting means upon heating of the union.

4. In a brazed tube union removing tool the combination of a two-part chambered body having split end walls with semi-circular cut-outs, means connecting said two part body for movement to separate the same for receiving a tube union within said chamber and the tube within said cut-outs on one split end wall, a sleeve slidable in said cut-outs on the opposite split end wall, an expandable end on said sleeve disposed within said chambered body, said expandable end engaging a tube union to be removed, the opposite end of said sleeve being disposed outwardly of said chambered body, means operably connected to said opposite end of said sleeve and exerting a push upon said opposite split end wall, means retaining said two part body chamber enclosed about the tube union to be removed, and means applying heat to said body chamber to soften the brazing holding the union, said push exerting means reacting to displace said sleeve and chambered body relative to each other to pull the union from the tube upon softening of the brazing.

5. A tube union removing tool including a body having an internal space and access openings thereto from the exterior, one of said access openings receiving a tube with a union brazed thereon which is to be removed, the union being located in said internal space, means carried by said body to heat the union in said internal space to soften the brazing material between the union and tube, and a union pulling device comprising a union gripping member extending through another of said access openings from the exterior and into gripping engagement with the union to be removed, and pulling means engaged with said member and reacting externally against said body to move from a first position adjacent said body to a final position spaced from said body upon softening of the brazing material.

6. The tube union removing tool set forth in claim 5, wherein said access openings are axially aligned across said internal space, and said gripping member is slidable through said another access opening so as to move lengthwise of the tube.

7. The tube union removing tool set forth in claim 5, wherein said pulling means comprises a first element connected to said union gripping means externally of said body and resilient thrust means engaged between said first element and said body.

References Cited by the Examiner

UNITED STATES PATENTS

| | | | |
|---|---|---|---|
| 2,649,527 | 8/1953 | Chapman et al. | 219—7.5 |
| 3,031,554 | 4/1962 | Jackson | 219—9.5 |
| 3,112,386 | 11/1963 | Oatman et al. | 219—7.5 |

RICHARD M. WOOD, *Primary Examiner.*